US012804111B2

(12) United States Patent
Chung et al.

(10) Patent No.: US 12,804,111 B2
(45) Date of Patent: Nov. 17, 2026

(54) PROJECTION SYSTEM, PROJECTION DEVICE AND CONTROL METHOD THEREOF

(71) Applicant: Coretronic Corporation, Hsin-Chu (TW)

(72) Inventors: Chih-Yi Chung, Hsin-Chu (TW); Ssu-Ming Chen, Hsin-Chu (TW); Hsin-Ya Lai, Hsin-Chu (TW); Wen-Wei Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 23 days.

(21) Appl. No.: 18/926,272

(22) Filed: Oct. 24, 2024

(65) Prior Publication Data

US 2025/0142034 A1 May 1, 2025

(30) Foreign Application Priority Data

Oct. 27, 2023 (CN) ......................... 202311408914.7

(51) Int. Cl.
*H04N 9/31* (2006.01)
*G10L 15/26* (2006.01)

(52) U.S. Cl.
CPC ........... *H04N 9/3185* (2013.01); *G10L 15/26* (2013.01)

(58) Field of Classification Search
CPC ....... G06F 3/167; G10L 15/183; G10L 15/22; G10L 15/30; G10L 15/26; G09G 2354/00;

(Continued)

(56) References Cited

U.S. PATENT DOCUMENTS

| | | | | |
|---|---|---|---|---|
| 11,206,372 B1 * | 12/2021 | Zhang | ................. | H04L 12/1813 |
| 2005/0231691 A1 * | 10/2005 | Li | ........................ | H04N 9/3194 353/69 |

(Continued)

FOREIGN PATENT DOCUMENTS

| | | |
|---|---|---|
| CN | 108319171 | 8/2020 |
| CN | 112598589 | 4/2021 |

OTHER PUBLICATIONS

Hsin-Ya Lai et al., "Projection System, Terminal Device, Projection Device and Control Method Thereof", unpublished U.S. Appl. No. 18/784,932, filed Jul. 26, 2024. The specification, claims, abstract and drawings of the unpublished pending U.S. application have been stored in the Documents & Transactions of Patent Center.

*Primary Examiner* — Priyank J Shah
(74) *Attorney, Agent, or Firm* — JCIPRNET

(57) ABSTRACT

A projection system, a projection device, and a control method thereof are provided. The control method of the projection device includes the following steps: transmitting a first original command by a terminal device; projecting an adjustment image by the projection device in response to the first original command corresponding to an image correction operation of the projection device, wherein the adjustment image includes at least one pattern array and at least one adjustment reference point; transmitting a second original command by the terminal device; and adjusting a position of the at least one adjustment reference point of the adjustment image by the projection device in response to the second original command corresponding to adjusting the position of the at least one adjustment reference point of the adjustment image, wherein the at least one adjustment reference point is located in the corresponding at least one pattern array.

24 Claims, 10 Drawing Sheets

(58) Field of Classification Search
CPC .......... G09G 2370/022; G09G 2370/06; G06T 5/80; H04N 9/3185
See application file for complete search history.

(56) References Cited

U.S. PATENT DOCUMENTS

| | | | | |
|---|---|---|---|---|
| 2019/0219907 | A1* | 7/2019 | Kurota | H04N 9/3194 |
| 2020/0105258 | A1* | 4/2020 | Lin | H04N 9/3194 |
| 2020/0160042 | A1* | 5/2020 | Bui | G10L 15/24 |
| 2023/0015137 | A1* | 1/2023 | Tokuyama | H04N 9/3185 |

* cited by examiner

PROJECTION SYSTEM, PROJECTION DEVICE AND CONTROL METHOD THEREOF

CROSS-REFERENCE TO RELATED APPLICATION

This application claims the priority benefit of China application serial no. 202311408914.7, filed on Oct. 27, 2023. The entirety of the above-mentioned patent application is hereby incorporated by reference herein and made a part of this specification.

BACKGROUND

Technical Field

The disclosure relates to a display technology, and particularly to a projection system, a projection device, and a control method thereof.

Description of Related Art

The current control method of projectors involves adjusting the projection image projected by the projector (such as keystone correction) through manual operation of the projector's remote control or operation of the human-machine interface on the projector by the user. Therefore, the adjustment method of the projection image of traditional projectors is inconvenient.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a projection system, a projection device, and a control method thereof, which may achieve the function of correcting the projection image.

Other objects and advantages of the disclosure may be further understood from the technical features disclosed in the disclosure.

In order to achieve one or a portion of or all of the above objectives or other objectives, a control method of the projection device of the disclosure includes the following steps. A first original command is transmitted by a terminal device. An adjustment image is projected by the projection device in response to the first original command corresponding to an image correction operation of the projection device, wherein the adjustment image includes at least one pattern array and at least one adjustment reference point. A second original command is transmitted by the terminal device. A position of the at least one adjustment reference point of the adjustment image is adjusted by the projection device in response to the second original command corresponding to adjusting the position of the at least one adjustment reference point of the adjustment image, wherein the at least one adjustment reference point is located in the corresponding at least one pattern array.

In order to achieve one or a portion of or all of the above objectives or other objectives, a projection system of the disclosure includes a terminal device and a projection device. The terminal device is configured to transmit a first original command and a second original command. The projection device is coupled to the terminal device. The projection device is configured to project an adjustment image in response to the first original command corresponding to an image correction operation of the projection device. The adjustment image includes at least one pattern array and at least one adjustment reference point. The projection device is configured to adjust a position of the at least one adjustment reference point of the adjustment image in response to the second original command corresponding to adjusting the position of the at least one adjustment reference point of the adjustment image. The at least one adjustment reference point is located in the corresponding at least one pattern array.

In order to achieve one or a portion of or all of the above objectives or other objectives, a projection device of the disclosure includes a projection module, a communication interface, and a processor. The projection module is configured to project an adjustment image. The communication interface is configured to receive a first original command and a second original command. The processor is coupled to the projection module and the communication interface. The processor is configured to: control the projection module to project the adjustment image in response to the first original command corresponding to an image correction operation of the projection device, wherein the adjustment image includes at least one pattern array and at least one adjustment reference point; and control the projection module to adjust a position of the at least one adjustment reference point of the adjustment image in response to the second original command corresponding to an adjustment of the position of the at least one adjustment reference point of the adjustment image, wherein the at least one adjustment reference point is located in the corresponding at least one pattern array.

Based on the above, the projection system, the projection device, and the control method of the disclosure may instantly identify the commands input by the user and automatically generate corresponding commands to control the projection device to achieve the function of correcting the projection image.

Other objectives, features and advantages of the present invention will be further understood from the further technological features disclosed by the embodiments of the present invention wherein there are shown and described preferred embodiments of this invention, simply by way of illustration of modes best suited to carry out the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
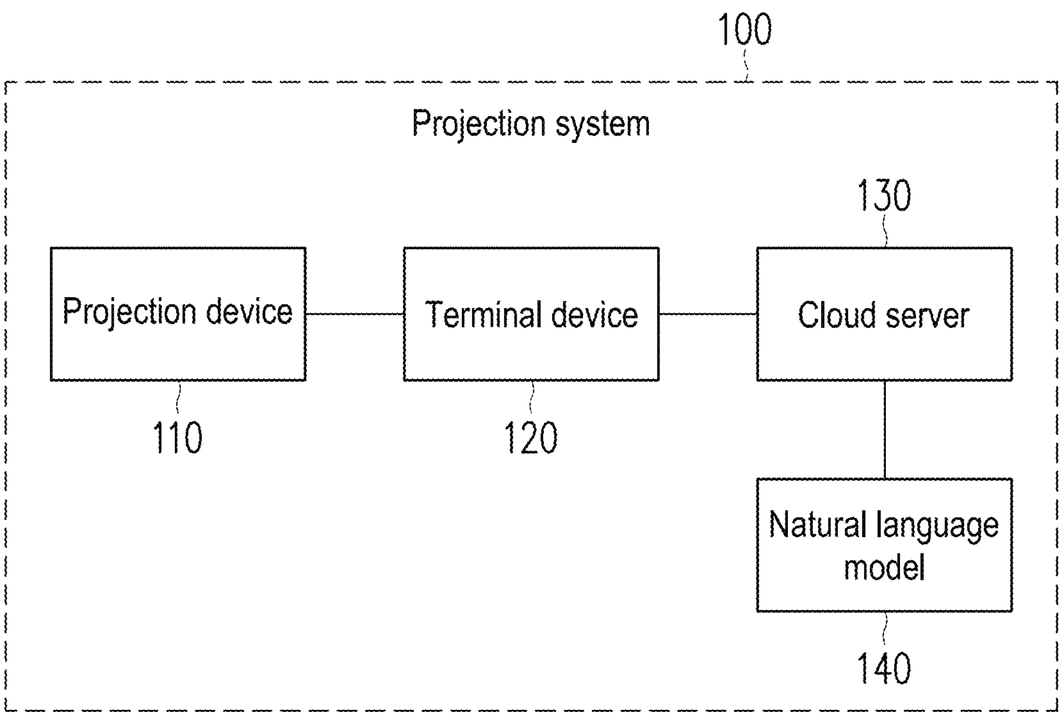
FIG. 1 is a schematic diagram of a projection system according to an embodiment of the disclosure.

FIG. 1 is a schematic diagram of a projection system according to an embodiment of the disclosure Referring to FIG. 1, a projection system 100 includes a projection device 110, a terminal device 120, a cloud server 130, and a natural language model 140. The terminal device 120 is coupled to the projection device 110 and the cloud server 130. The cloud server 130 is also coupled to the natural language model 140. In the embodiment, the projection device 110 may communicate with the terminal device 120 and the cloud server 130 through wired and/or wireless communication methods. The wired communication method is, for example, a cable. The wireless communication method includes, for example, Wifi, Bluetooth, and/or the Internet. The natural language model 140 may be stored in the cloud server 130 or connected to the cloud server 130 through a wireless network.

In the embodiment, the terminal device 120 may have voice and/or text input functions. The terminal device 120 may be, for example, a smart phone, a tablet computer, a personal computer, a remote control of the projection device 110, or other smart portable devices or electronic devices with input functions. The projection device 110 (projector) may include, for example, a communication interface and a projection module. In the embodiment, the user may perform command input through the terminal device 120 to input original commands for controlling the projection device 110, and perform relevant original command identification and generate standard commands for controlling the projection device 110 to achieve the function of controlling the projection device 110 by the terminal device 120, the cloud server 130, and the natural language model 140.

In the embodiment, the terminal device 120 includes, for example, at least one processor, a screen, and a communication interface. The processor is coupled to the screen and the communication interface. The at least one processor may include, for example, a central processing unit (CPU), a graphics processing unit (GPU), other programmable general-purpose or special-purpose microprocessors, a digital signal processor (DSP), a programmable controller, an application specific integrated circuit (ASIC), a programmable logic device (PLD), other similar processing devices, or a combination thereof. The terminal device 120 may also include a storage device (not shown). The storage device is, for example, any form of fixed or movable random access memory (RAM), a read-only memory (ROM), a flash memory, a hard disk, or other circuits or chips with similar functions, or a combination thereof. One or more application programs are stored in the storage device. After the application programs are installed on the terminal device 120, the application programs may be executed by the processor. In the embodiment, the screen is configured to display images, and the screen may be, for example, a liquid crystal display (LCD), a light emitting diode (LED) display, an organic light emitting diode (OLED) display, etc. The terminal device 120 may further include a voice reception device, such as a microphone, and the voice reception device is coupled to the processor. The communication interface is, for example, a chip or circuit using wired and/or wireless communication technologies or mobile communication technology. The mobile communication technology is, for example, a global system for mobile communications (GSM), a third-generation mobile communication technology (3G), a fourth-generation mobile communication technology (4G), a fifth-generation mobile communication technology (5G), etc.

In the embodiment, the natural language model 140 may be, for example, a ChatBot. The ChatBot has a machine learning algorithm. The ChatBot may be, for example, any pre-trained ChatBot such as a chat generative pre-trained transformer (ChatGPT), Microsoft Bing, Google Bard, or an ERNIE Bot, or the natural language model 140 may be a dedicated ChatBot trained with data in a specific field. The natural language model 140 may be configured to perform natural language processing and understanding, dialogue management, speech recognition (speech-to-text), text-to-speech, etc. The natural language model 140 may identify multiple languages and multiple accents. In the embodiment, the natural language model 140 may be disposed in the cloud server 130 or a third-party cloud server. The cloud server 130 and the third-party cloud server may include at least one processor and a storage device. The storage device is, for example, configured to store a ChatBot with a machine learning algorithm, and the at least one processor is, for example, configured to execute the algorithm.

Figure 2:
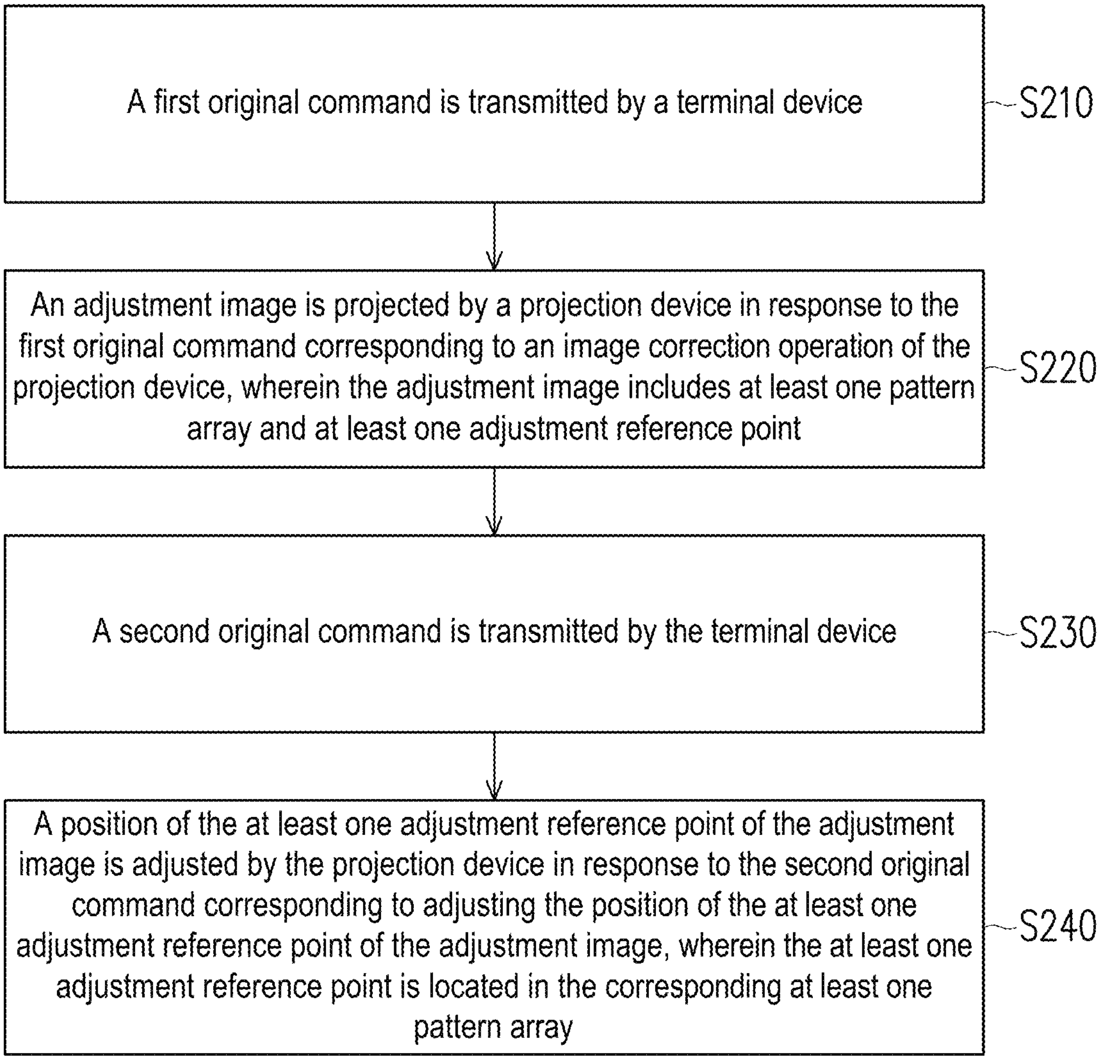
FIG. 2 is a flowchart of a control method of a projection device according to an embodiment of the disclosure.

FIG. 2 is a flowchart of a control method of a projection device according to an embodiment of the disclosure. Referring to FIG. 1 and FIG. 2, the projection device 110 may perform the following steps S210 to S240. In the embodiment, the user may input a first original command and a second original command into the terminal device 120 in voice or text manner. For example, the processor of the terminal device 120 may display a control interface on the screen through an application program, and may receive the original commands through the control interface. The control interface includes an option to activate a recording function of the voice reception device. When the voice reception device is activated, the control interface may receive the original commands in the form of voice through the voice reception device. The control interface may also include an option to enter a text command, and the processor of the terminal device 120 may receive the original commands in the form of text input by the user. In the embodiment, the first original command corresponds to, for example, an operation in which the user would like to enable the projection device 110 to project an adjustment image. The second original command, for example, corresponds to an operation in which the user would like to adjust a position of an adjustment reference point of the adjustment image projected by the projection device 110.

In step S210, the terminal device 120 may transmit the first original command. In step S220, the projection device 110 may project the adjustment image onto a projection target in response to the first original command corresponding to an image correction operation of the projection device 110. The adjustment image includes at least one pattern array and at least one adjustment reference point. For example, the user may input a voice command (the first original command) in the form of natural language such as "I want to correct the image" or "I want to adjust the tilted image" through the terminal device 120, then the terminal device 120 or the cloud server 130 may provide a corresponding standard command (a first standard command) or projector control code (a first projector control code) to the projection device 110, so that the projection device 110 may perform the image correction operation according to the corresponding standard command or projector control code to project the adjustment image onto the projection target.

In step S230, the terminal device 120 may transmit the second original command. In step S240, the projection device 110 may adjust a position of the at least one adjustment reference point of the adjustment image in response to the second original command corresponding to adjusting the position of the at least one adjustment reference point of the adjustment image. The at least one adjustment reference point is located in the corresponding at least one pattern array. In the embodiment, the at least one pattern array may include, for example, a grid pattern array, a dot pattern array, or other pattern arrays of any shape. The at least one adjustment reference point may be adjusted to any position on any pattern in the at least one pattern array, such as the center point or the vertex of the pattern. For example, the at least one adjustment reference point may be adjusted to any grid pattern of the at least one grid pattern array, or may be adjusted to any dot of the at least one dot pattern array.

For example, the pattern array is a grid pattern array, and each grid has a corresponding coordinate value. The at least one adjustment reference point is, for example, the four corner vertices of a quadrilateral adjustment image. The user may, for example, input a voice command (the second original command) in the form of natural language such as "I want to adjust the upper left corner of the adjustment image to coordinates (4,3)" through the terminal device 120. The terminal device 120 or the cloud server 130 may provide a corresponding standard command (a second standard command) or projector control code (a second projector control code) to the projection device 110, so that the projection device 110 may adjust the upper left corner of the adjustment image to the coordinates (4,3) according to the corresponding standard command or projector control code.

In steps S210 and S230, the terminal device 120 may transmit the first original command and the second original command to the cloud server 130. The cloud server 130 may receive the first original command and the second original command, and input a corresponding rule command, the first original command, and the second original command into the natural language model 140. The rule command may, for example, be a command configured to limit the natural language model 140 to output only commands that may be interpreted by the projection device 110 or converted into projector control codes of the projection device 110. For further related information regarding the rule command, reference may be made to U.S. application Ser. No. 18/784,932 ("PROJECTION SYSTEM, TERMINAL DEVICE, PROJECTION DEVICE AND CONTROL METHOD THEREOF") filed on Jul. 26, 2024, the contents of which are hereby incorporated by reference. The natural language model 140 may respectively convert the first original command and the second original command into the first standard command and the second standard command according to the rule command, and transmit the first standard command and the second standard command to the cloud server 130. The cloud server 130 may receive the first standard command and the second standard command to control the projection device 110 to project and adjust the adjustment image. The cloud server 130 may further transmit the first standard command and the second standard command to the terminal device 120 to control the projection device 110 to project the adjustment image and adjust the position of the adjustment reference point of the adjustment image through the terminal device 120.

In an embodiment, the projection device 110 may also be communicatively connected to the cloud server 130. The terminal device 120 may transmit the first original command and the second original command to the projection device 110, so that the projection device 110 transmits the first original command and the second original command to the cloud server 130. The cloud server 130 may transmit the first standard command and the second standard command to the projection device 110 to directly control the projection device 110 to project the adjustment image and adjust the position of the adjustment reference point of the adjustment image.

In another embodiment, the terminal device 120 or the cloud server 130 may further include a speech recognition model to convert the first original command and the second original command in the form of voice data into the first original command and the second original command in the form of text data, and then input the same (text data) into the natural language model 140. Alternatively, the natural language model 140 may also directly interpret the first original command and the second original command in the form of voice data.

In the embodiment, the first standard command and the second standard command may, for example, be commands that may be interpreted by the projection device 110. The cloud server 130 may transmit the first standard command and the second standard command to the terminal device 120, so that the terminal device 120 outputs the first standard command and the second standard command to the projection device 110 to control the projection device 110. Alternatively, the terminal device 120 may further convert the first standard command and the second standard command into the first projector control code and the second projector control code corresponding to the machine type of the projection device 110 according to projection device information of the projection device 110, and output the projector control code to the projection device 110. The projection device information may include, for example, the machine type or the model of the projection device 110. Alternatively, in an embodiment, the cloud server 130 may further convert the first standard command and the second standard command into the first projector control code and the second projector control code according to the projection device information of the projection device 110 to control the projection device 110. The projection device 110 may receive the first projector control code and the second projector control code from the cloud server 130. For further related information regarding the terminal device 120 obtaining the projection device information of the projection device 110, reference may be made to U.S. application Ser. No. 18/784,932 ("PROJECTION SYSTEM, TERMINAL DEVICE, PROJECTION DEVICE AND CONTROL METHOD THEREOF") filed on Jul. 26, 2024, the contents of which are hereby incorporated by reference.

In an embodiment, the terminal device 120 may receive the first projector control code and the second projector control code from the cloud server 130 and transmit the first projector control code and the second projector control code to the projection device 110. When the first original command and the second original command correspond to the operation of the projection device 110, the terminal device 120 may output the first projector control code and the second projector control code to the projection device 110 to drive the projection device 110 to perform the operations corresponding to the first projector control code and the second projector control code (such as projecting the adjustment image and adjusting the adjustment image). The first projector control code and the second projector control code respectively correspond to the first original command and the second original command. In an embodiment, if the original command does not correspond to the operation of the projection device 110, the natural language model 140 may generate feedback information according to the original command, and transmit the feedback information to at least one of the terminal device 120 and the projection device 110 through the cloud server 130 so as to inform the user that the projection device 110 cannot perform the operation. For example, the feedback information may be displayed on the screen of the terminal device 120 or projected on the projection target by the projection device 110 in the form of graphics and/or text, or the feedback information may be played in the form of audio through the speakers of the terminal device 120 or the projection device 110.

Figure 3:
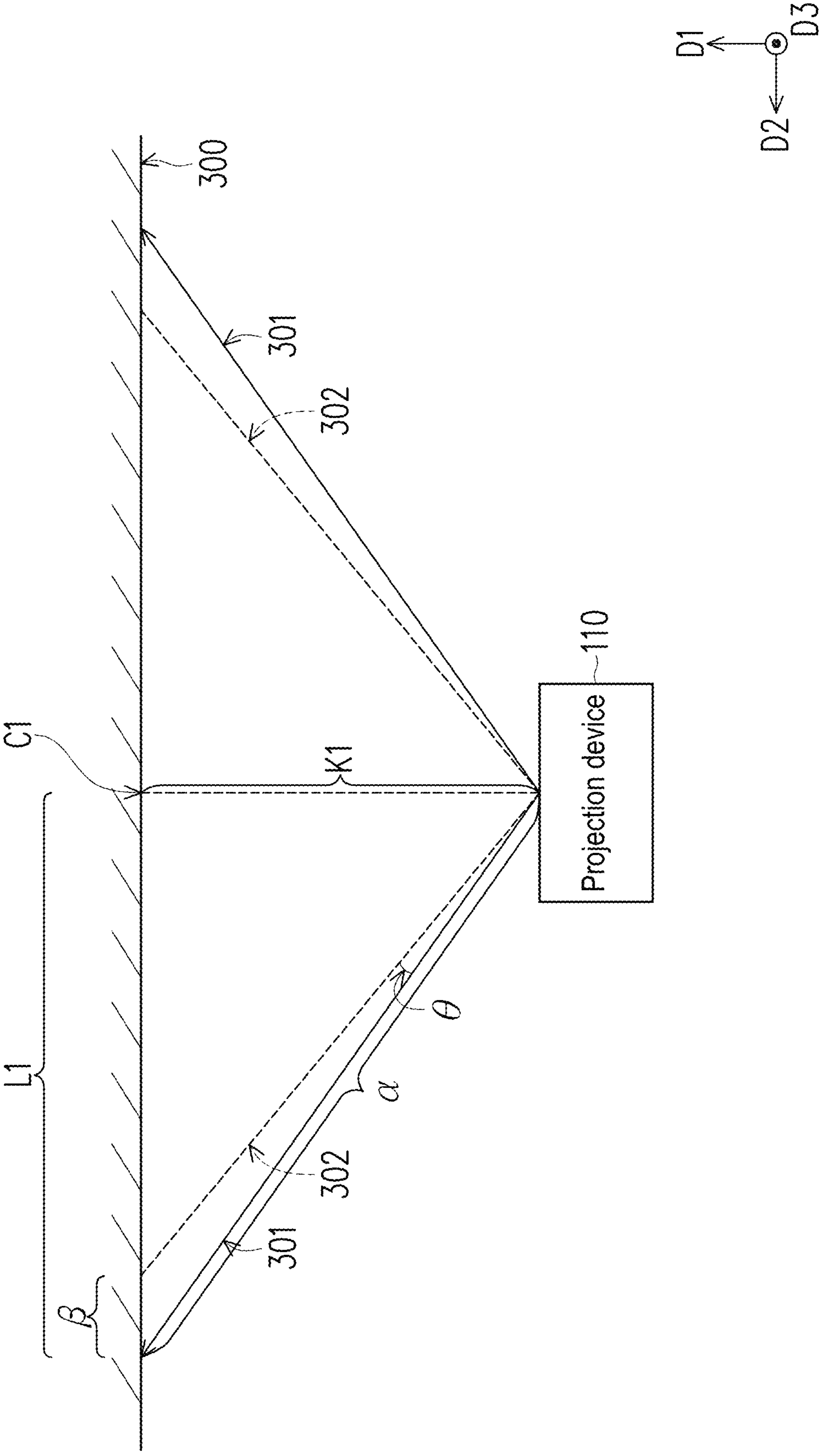
FIG. 3 is a schematic diagram of a configuration relationship between a projection device and a projection target according to an embodiment of the disclosure.
Figure 4:
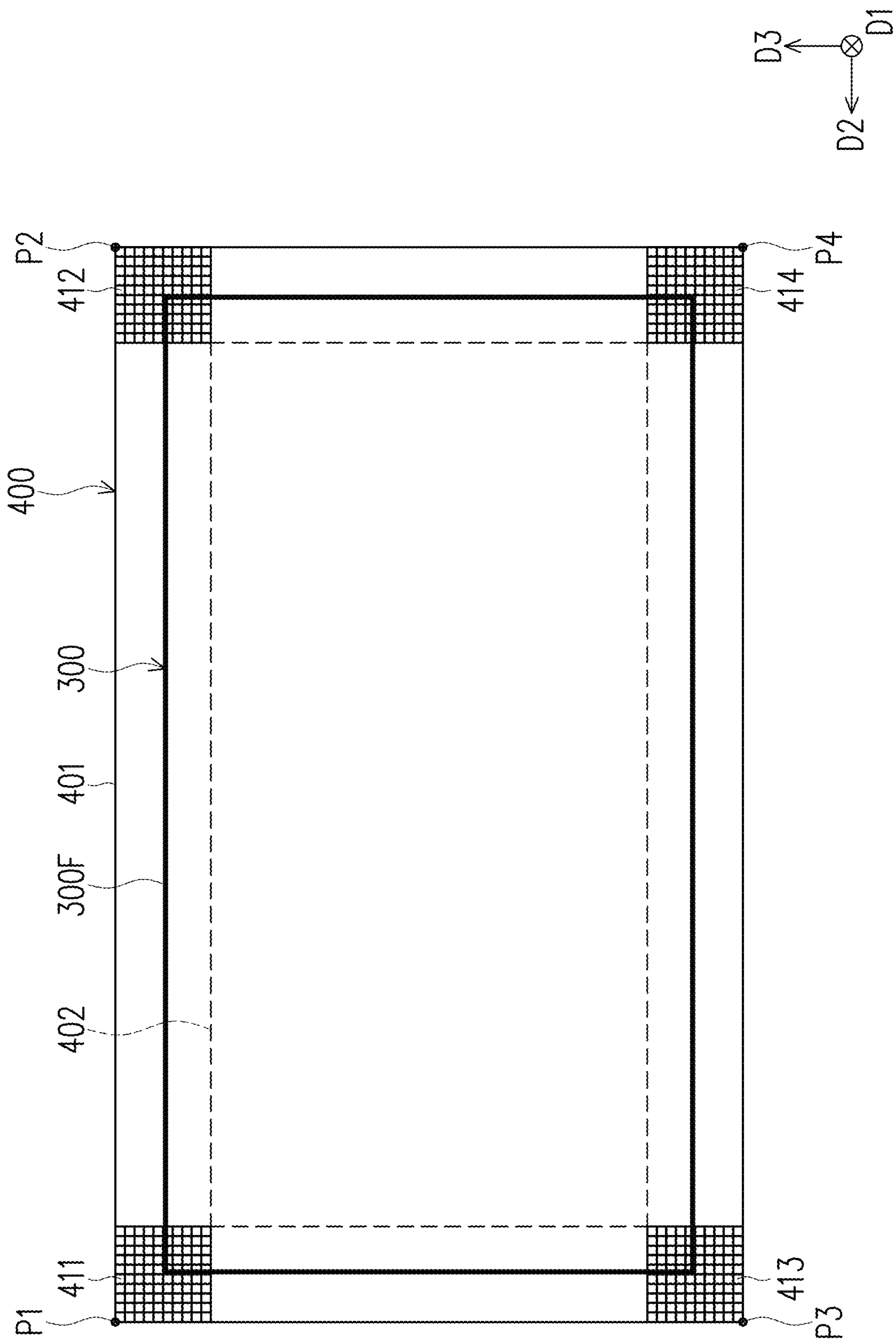
FIG. 4 is a schematic diagram of an adjustment image according to an embodiment of the disclosure.

The projection device 110 of the embodiment may adjust the projection image conveniently and quickly to achieve an accurate keystone correction effect. The data form and command content of the voice command may be determined based on the type of the natural language model 140. The adjustment image of the embodiment and the specific implementation of the adjusting of the adjustment image will be described in detail in the following embodiments. Referring to FIG. 1 to FIG. 4, FIG. 3 is a schematic diagram of a configuration relationship between a projection device and a projection target according to an embodiment of the disclosure. FIG. 4 is a schematic diagram of an adjustment image according to an embodiment of the disclosure. In the embodiment, after the user issues the (first) original command through voice control to enable the projection device 110 to project the adjustment image (step S220), the user may, for example, adjust the position of the projection device 110 according to the projection image projected by the projection device 110. As shown in FIG. 3, a projection target 300 is, for example, a projection screen, a desktop, a wall, etc., and the projection target 300 is, for example, a plane. The plane is, for example, parallel to a plane formed by respectively extending in a direction D2 (horizontal direction) and a direction D3 (vertical direction), and the projection device 110 may project onto the projection target 300 toward a direction D1 (horizontal direction). The directions D1, D2 and D3 are, for example, perpendicular to each other. As shown in FIG. 4, the projection device 110 may project an adjustment image 400 shown in FIG. 4. The adjustment image 400 includes an outer frame 401, an inner frame 402, and a plurality of pattern arrays 411 to 414. The pattern arrays 411 to 414 may respectively include grid pattern arrays respectively corresponding to the upper left corner, upper right corner, lower left corner, and lower right corner of the adjustment image 400, and adjustment reference points P1 to P4 are respectively located in the corresponding pattern arrays 411 to 414. The pattern arrays 411 to 414 are respectively located between the outer frame 401 and the inner frame 402. The adjustment reference points P1 to P4 are, for example, the four vertices of the outer frame 401. The inner frame 402 is, for example, the frame of the projection image area of the projection device 110 during actual projecting content. In an embodiment, the adjustment reference points P1 to P4 are, for example, the four vertices of the inner frame 402 or other points located in the pattern arrays 411 to 414.

In the embodiment, the user may first manually adjust the position of the projection device 110, so that a correction frame 300F of the projection target 300 (for example, the outer frame edge of the projection screen) may be located between the outer frame 401 and the inner frame 402. As shown in FIG. 3, the outer frame 401 of the adjustment image 400 may be projected onto the projection target 300 along a transmission path 301 of an image beam, and the inner frame 402 of the adjustment image 400 may be projected onto the projection target 300 along a transmission path 302 of the image beam. There is a length L1 from a projection center point C1 of the adjustment image 400 to the position of the outer frame 401 on any side (right side or left side), and there is a distance K1 from the projection center point C1 of the adjustment image 400 to the projection device 110. For example, taking a throw ratio of 0.5 (K1/2L1) as an example, when the correction frame 300F is located between the outer frame 401 and the inner frame 402, the left and right rotation angle of the projection device 110 may be controlled at plus or minus 4.04, so that the tilt angle and the image deformation of the projection device 110 are within the controllable range so as to increase the correction accuracy. The distance relationship is shown in FIG. 3. Assume that the length L1 is 100 cm and the distance K1 is 100 cm. The side a is $100\times\sqrt{2}\approx141.4$. The length β of the opposite side is a preset known length, for example, 10 cm. The length β of the opposite side may be, for example, the shortest distance between the outer frame 401 and the inner frame 402 in the direction D2. Therefore, an included angle θ is calculated by the following formula (1) and formula (2). The included angle θ≈4.04°.

$$\tan(\theta)=\frac{\beta}{\alpha}=\frac{10}{141.4}\approx0.0704 \qquad \text{Formula (1)}$$

$$\theta=\arctan(0.0704)\approx4.04^\circ \qquad \text{Formula (2)}$$

Referring again to FIG. 4, in the embodiment, the pattern arrays 411 to 414 may be grid pattern arrays corresponding to four coordinate systems. The grid pattern array may be, for example, a grid of 10×10 coordinate system, and the distance between each grid is, for example, 10 pixels. In the embodiment, the grid in the lower left corner is used as the starting coordinate (0,0) for example. The positive x-axis of the coordinate system may be oriented in the direction opposite to the direction D2, and the positive y-axis of the coordinate system may be oriented in the direction of the direction D3. The position of the above-mentioned starting coordinate (0,0) and the directions of the positive x-axis and the positive y-axis of the coordinate system may be adjusted according to the usage situation, and are not specifically limited by the disclosure.

In the embodiment, the user, for example, can adjust the positions of the adjustment reference points P1 to P4 through voice control (i.e., step S230), and the adjusted displacement amounts of the adjustment reference points P1 to P4 may be obtained by referring to the calculation of the following formula (3) to formula (6). In the following formula (3) to formula (6), DP1 to DP4 are the adjusted displacement amounts of the adjustment reference points P1 to P4 respectively. The unit of displacement amounts DP1 to DP4 is pixel distance. (X1,Y1), (X2,Y2), (X3,Y3), and (X4,Y4) are the target adjustment coordinates of the adjustment reference points P1 to P4 respectively, that is, based on the (second) original command provided by the user, the adjustment reference points P1 to P4 are moved to the target adjustment coordinates.

$$DP1=(X1\times 10,(Y1-10)\times 10) \quad \text{Formula (3)}$$

$$DP2=((X2-10)\times 10,(Y2-10)\times 10) \quad \text{Formula (4)}$$

$$DP3=(X3\times 10,Y3\times 10) \quad \text{Formula (5)}$$

$$DP4=((X4-10)\times 10,Y4\times 10) \quad \text{Formula (6)}$$

For example, assuming that the (second) original command output by the user is to adjust the adjustment reference point P1 to the target adjustment coordinate (8,2), then the displacement amount of the target adjustment coordinate is (80,−80) (the unit is pixel distance, and the positive and negative signs represent direction). Assuming that the (second) original command output by the user is to adjust the adjustment reference point P2 to the target adjustment coordinate (4,7), then the displacement amount of the target adjustment coordinate is (−60,−30). Assuming that the (second) original command output by the user is to adjust the adjustment reference point P3 to the target adjustment coordinate (6,3), then the displacement amount of the target adjustment coordinate is (60,30). Assuming that the (second) original command output by the user is to adjust the adjustment reference point P4 to the target adjustment coordinate (5,5), then the displacement amount of the target adjustment coordinate is (−50,50). In an embodiment, the projection device 110 may, for example, calculate the adjustment angle and the deformation amount required for adjustment of the adjustment image 400 projected by the projection device 110 according to the second original command. For example, the projection device 110 may calculate and adjust and obtain the slope changes of the adjustment reference points P1 to P4 according to the adjustment reference points P1 to P4 or the displacement amounts DP1 to DP4.

The patterns, shapes, and numbers of the pattern arrays and the numbers of the adjustment reference points of the disclosure are not limited to those shown in FIG. 4. In an embodiment, the number of the pattern arrays and the number of the adjustment reference points of the disclosure may be at least one respectively.

Figure 5A:
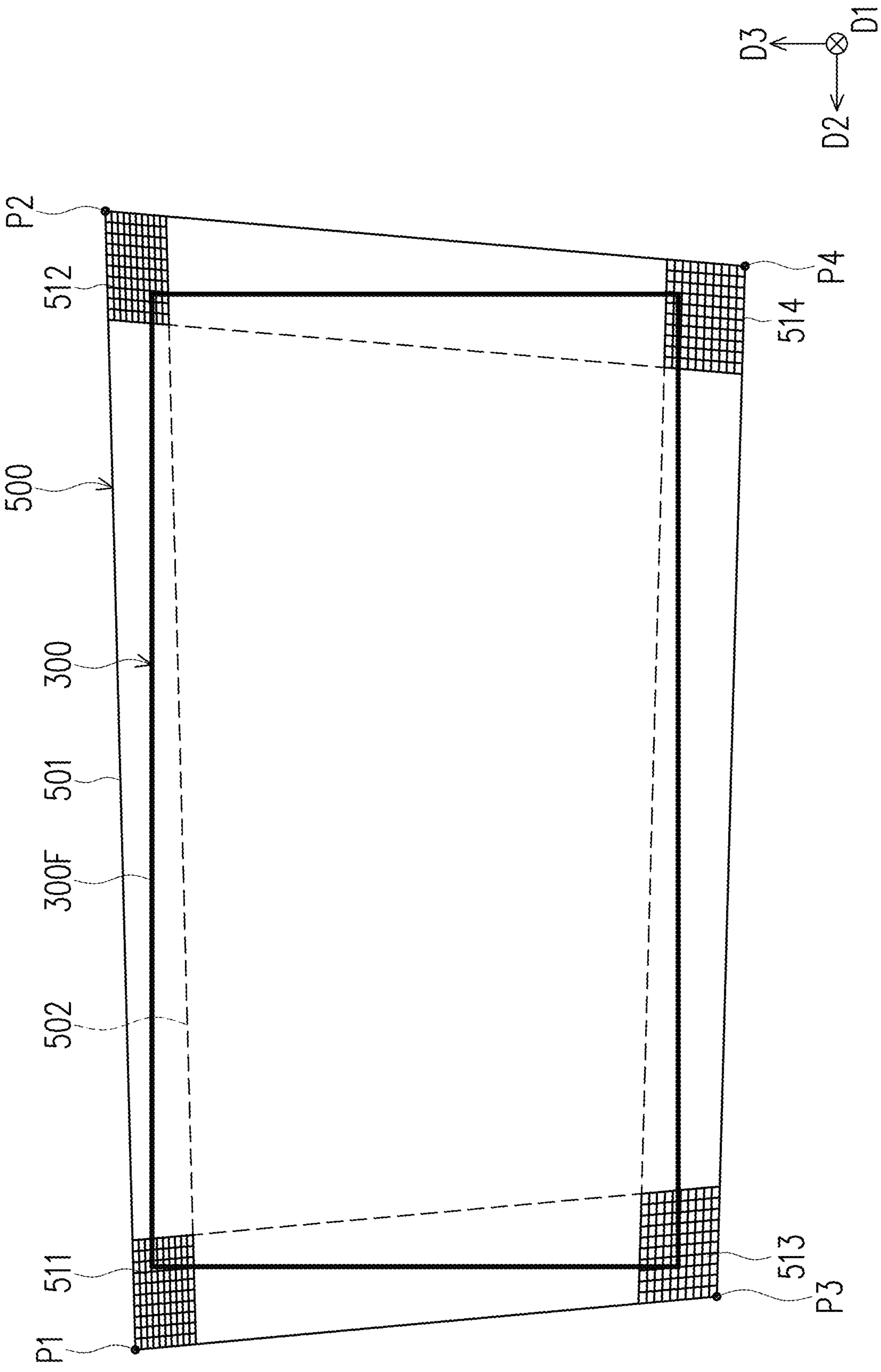
FIG. 5A to FIG. 5E are schematic diagrams of an adjustment of an adjustment image according to an embodiment of the disclosure.

FIG. 5A to FIG. 5E are schematic diagrams of an adjustment of an adjustment image according to an embodiment of the disclosure. Referring to FIG. 1 and FIG. 5A to FIG. 5E, for example, as shown in FIG. 5A, the user may enable the projection device 110 to project an adjustment image 500 onto the projection target 300 through voice control. The adjustment image 500 includes an outer frame 501, an inner frame 502, and a plurality of pattern arrays 511 to 514. The pattern arrays 511 to 514 may respectively include quadrilateral pattern arrays. In the embodiment, since the adjustment image 500 before correction is a tilted image or an irregular quadrilateral image, the shapes of the pattern arrays 511 to 514 are, for example, tilted or irregular quadrilaterals. The adjustment reference points P1 to P4 are respectively located in the corresponding pattern arrays 511 to 514. The pattern arrays 511 to 514 are respectively located between the outer frame 501 and the inner frame 502, and the reference points P1 to P4 are the four vertices of the outer frame 501. The user may adjust the positions of the adjustment reference points P1 to P4 of the adjustment image 500 one by one through voice control, so that the correction frame 300F of the projection target 300 may be located between the outer frame 501 and the inner frame 502 of the adjustment image, or the outer frame 501 of the adjustment image 500 overlaps the correction frame 300F of the projection target 300.

Figure 5B:
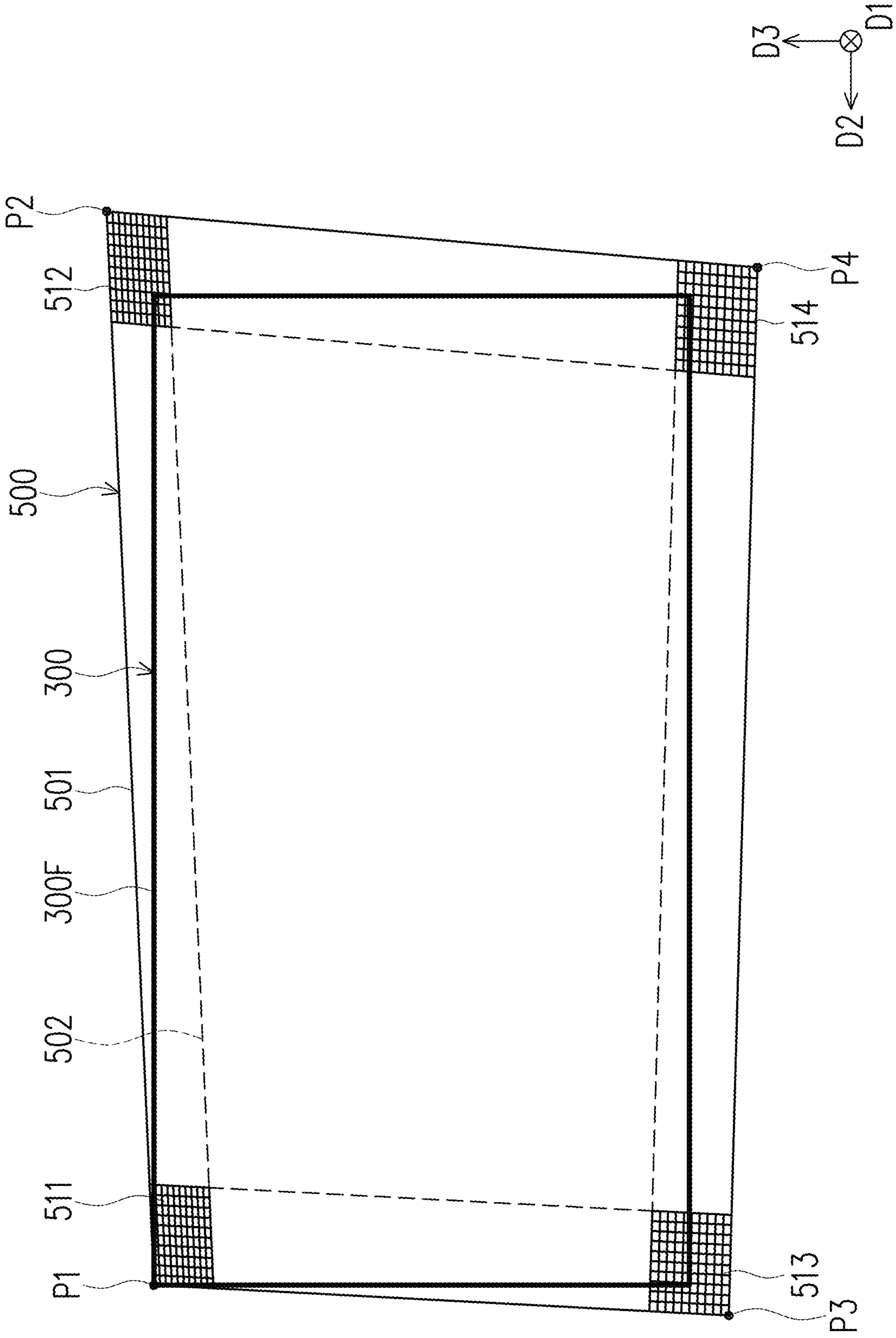

As shown in FIG. 5A and FIG. 5B, the user may, for example, input the (second) original command to "move the adjustment reference point P1 in the upper left corner to coordinates (7,7)". After the above-mentioned conversion by the cloud server 130 and the natural language model 140, the projection device 110 may correspondingly adjust the position of the adjustment reference point P1 to the coordinates (7,7) of the original adjustment image 500 (the upper left corner of the adjustment image 500 as shown in FIG. 5A), and update the adjusted result of the adjustment reference point P1 in the upper left corner of the adjustment image 500 as shown in FIG. 5B. The adjusted adjustment reference point P1 may be located, for example, at the vertex position of the upper left corner of the correction frame 300F of the projection target 300.

Figure 5C:
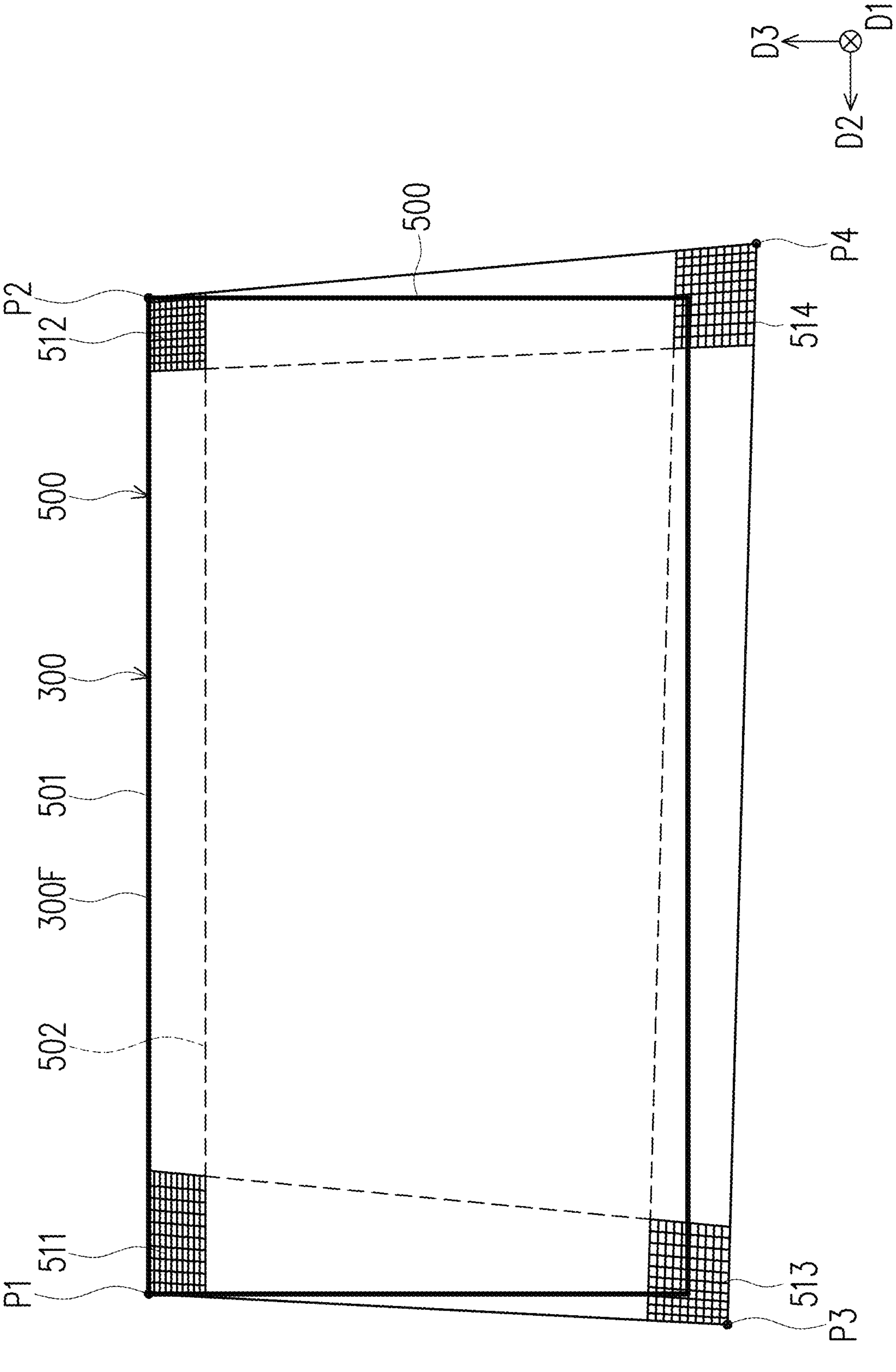

As shown in FIG. 5B to FIG. 5C, the user may, for example, input the (second) original command to "move the adjustment reference point P2 in the upper right corner to coordinates (3,3)". After the above-mentioned conversion by the cloud server 130 and the natural language model 140, the projection device 110 may correspondingly adjust the position of the adjustment reference point P2 to the coordinates (3,3) of the original adjustment image 500 (the upper right corner of the adjustment image 500 as shown in FIG. 5B), and update the adjusted result of the adjustment reference point P2 in the upper right corner of the adjustment image 500 as shown in FIG. 5C. The adjusted adjustment reference point P2 may be located, for example, at the vertex position of the upper right corner of the correction frame 300F of the projection target 300.

Figure 5D:
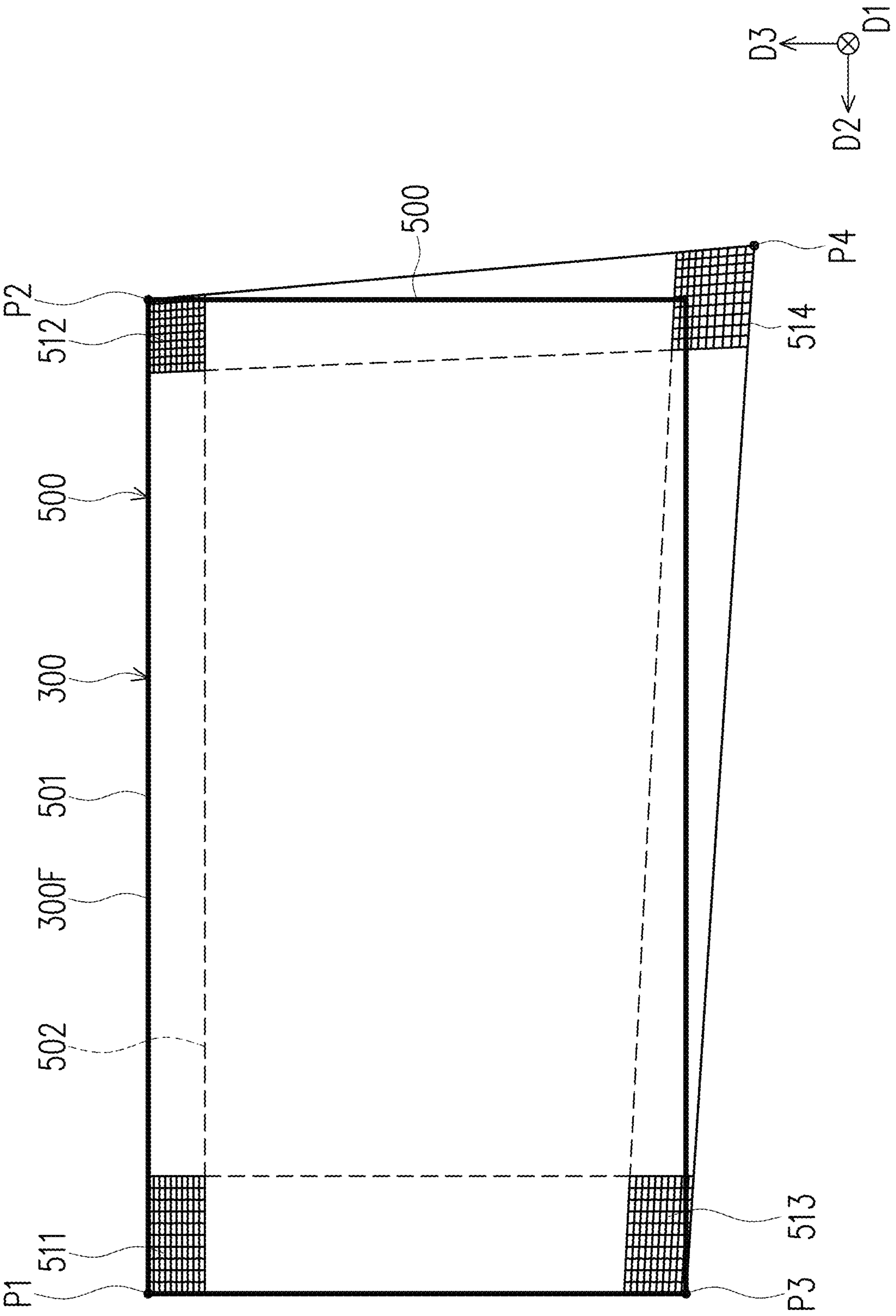

As shown in FIG. 5C to FIG. 5D, the user may, for example, input the (second) original command to "move the adjustment reference point P3 in the lower left corner to coordinates (3,5)". After the above-mentioned conversion by the cloud server 130 and the natural language model 140, the projection device 110 may correspondingly adjust the position of the adjustment reference point P3 to the coordinates (3,5) of the original adjustment image 500 (the lower left corner of the adjustment image 500 as shown in FIG. 5C), and update the adjusted result of the adjustment reference point P3 in the lower left corner of the adjustment image 500 as shown in FIG. 5D. The adjusted adjustment reference point P3 may be located, for example, at the vertex position of the lower left corner of the correction frame 300F of the projection target 300.

Figure 5E:
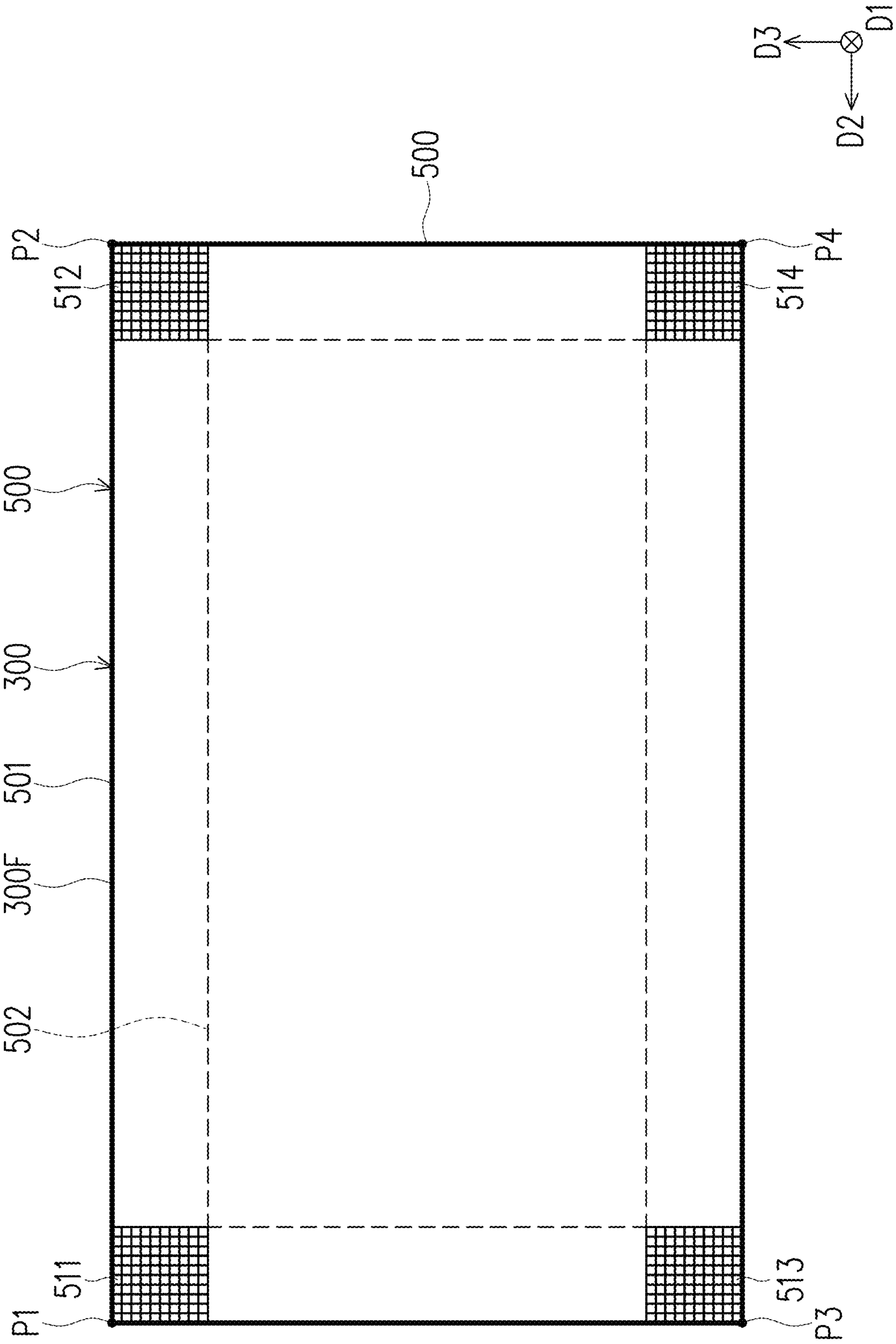

As shown in FIG. 5D to FIG. 5E, the user may, for example, input the (second) original command to "move the adjustment reference point P4 in the lower right corner to coordinates (7,8)". After the above-mentioned conversion by the cloud server 130 and the natural language model 140, the projection device 110 may correspondingly adjust the position of the adjustment reference point P4 to the coordinates (7,8) of the original adjustment image 500 (the lower right corner of the adjustment image 500 as shown in FIG. 5D), and update the adjusted result of the adjustment reference point P4 in the lower right corner of the adjustment image 500 as shown in FIG. 5E. The adjusted adjustment reference point P4 may be located, for example, at the vertex position of the lower right corner of the correction frame 300F of the projection target 300.

In the embodiment, since the corrected adjustment image 500 is a non-tilted image, the shapes of the pattern arrays 511 to 514 are a rectangular grid. The four sides of the outer frame 501 of the adjusted adjustment image 500 may be respectively parallel to the four sides of the correction frame 300F. For example, the outer frame 501 may overlap the correction frame 300F; the correction frame 300F may be located between the outer frame 501 and the inner frame 502; or the correction frame 300F at least partially overlaps the outer frame 501 or the inner frame 502. In this way, the projection image of the projection device 110 may be corrected, and the projection image of the projection device 110 is located in the inner frame 502 of the corrected adjustment image 500 to effectively eliminate the problem of keystone distortion of the projection image.

Figure 6:
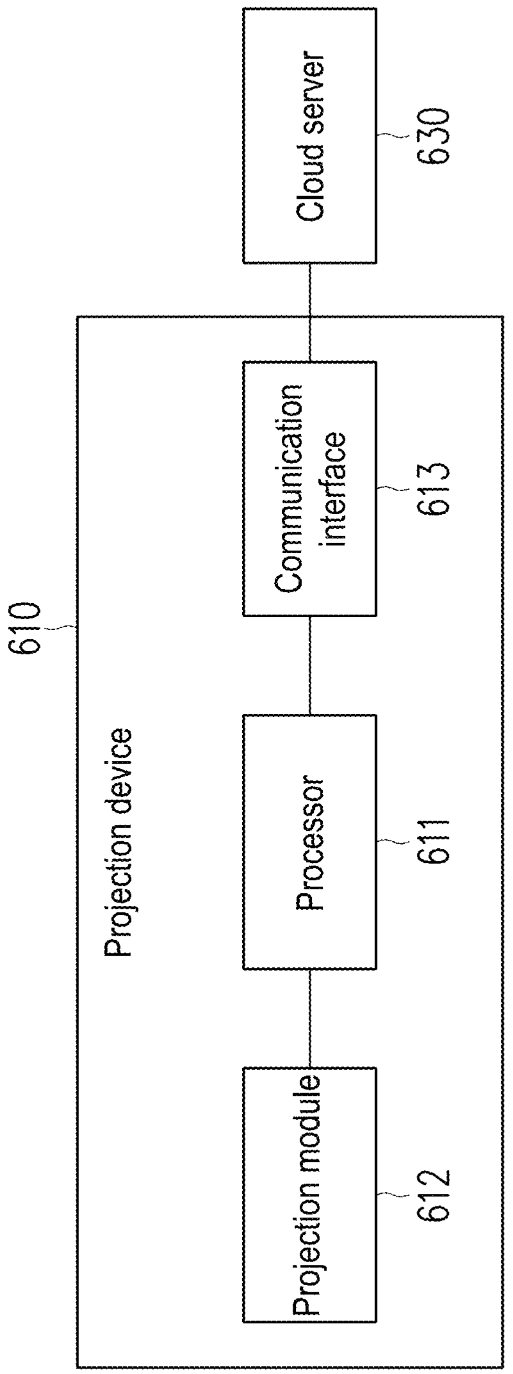
FIG. 6 is a schematic diagram of a projection device according to an embodiment of the disclosure.

FIG. 6 is a schematic diagram of a projection device according to an embodiment of the disclosure. Referring to FIG. 6, in the embodiment, a projection device 610 includes at least one processor 611, a projection module 612, and a communication interface 613. The projection module may project the adjustment image 400 as shown in FIG. 4 above. The at least one processor 611 is coupled to the projection module 612 and the communication interface 613. In the embodiment, the at least one processor 611 may include, for example, a central processing unit (CPU), a graphics processing unit (GPU), or other programmable general-purpose or special-purpose microprocessors, a digital signal processor (DSP), a programmable controller, an application specific integrated circuit (ASIC), a programmable logic device (PLD), or other similar processing devices, or a combination thereof. The projection device 610 may also include a storage device (not shown). The storage device is, for example, any form of fixed or movable random access memory (RAM), a read-only memory (ROM), a flash memory, a hard disk, or other circuits or chips with similar functions, or a combination thereof.

In the embodiment, the projection module 612 may include, for example, light sources, light valves, projection lenses and other related optical components and related circuit components thereof. The communication interface 613 may be connected to the cloud server 630. The projection device 610 and the cloud server 630 may communicate through wired and/or wireless communication methods. The wired communication method is, for example, a cable. The wireless communication method includes, for example, Wifi, Bluetooth, and/or the Internet.

In the embodiment, the communication interface 613 is, for example, a chip or circuit using wired and/or wireless communication technologies or mobile communication technology. The mobile communication technology includes a global system for mobile communications, third/fourth/fifth generation mobile communication technologies, etc.

The projection device 610 may also have a built-in voice reception device (a microphone) to directly receive the first original command and the second original command in the form of voice data from the user. The at least one processor 611 may transmit the first original command and the second original command to the cloud server 630 through the communication interface 613. In an embodiment, the communication interface 613 may receive the first original command and the second original command from a terminal device (such as the terminal device 120 in the embodiment of FIG. 1 described above).

In the embodiment, the projection device 610 may communicate with the cloud server 630 through the communication interface 613 to provide the first original command and the second original command to the cloud server 630. The cloud server 630 may input the first original command and the second original command into the natural language model, and the natural language model may generate the corresponding first standard command and the second standard command. The cloud server 630 may directly provide the first standard command and the second standard command to the projection device 610. In the embodiment, the cloud server 630 may, for example, be connected to the natural language model through the Internet. In an embodiment, the natural language model can also be built into the cloud server 630.

In the embodiment, the at least one processor 611 may receive the first standard command and the second standard command through the communication interface 613. The at least one processor 611 may convert the first standard command and the second standard command into the first projector control code and the second projector control code according to the projection device information to control the projection module 612 and adjust the adjustment image. The projection device 610 of the embodiment may directly detect the user's voice signal and generate a corresponding voice original command. The projection device 610 of the embodiment may obtain the corresponding standard commands through the cloud server 630 and the natural language model, so as to achieve the function of effectively adjusting the adjustment image through voice.

For the specific implementation manner and related technical details of the original commands, standard commands, and projector control codes of the embodiment, please refer to the description of the embodiments of FIG. 1 to FIG. 5E mentioned above, and thus are not repeated here.

To sum up, the projection system, the projection device, and the control method of the disclosure have at least one of the following advantages. The projection system, the projection device, and the control method of the disclosure may receive the user's natural language commands through the terminal device or the projection device, and may instantly identify the natural language commands input by the user and automatically generate corresponding standard commands, so as to enable the projection device to project the adjustment image and adjust the position of the adjustment reference point of the adjustment image, thereby achieving an effective projection image correction function.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A control method of a projection device, comprising the following steps:

transmitting a first original command by a terminal device;

projecting an adjustment image by the projection device in response to the first original command corresponding to an image correction operation of the projection device, wherein the adjustment image comprises an outer frame, an inner frame, at least one pattern array, and at least one adjustment reference point, wherein the at least one pattern array is located between the outer frame and the inner frame, and the at least one adjustment reference point is a vertex of the outer frame;

transmitting a second original command by the terminal device; and adjusting a position of the at least one adjustment reference point of the adjustment image by the projection device in response to the second original command corresponding to adjusting the position of the at least one adjustment reference point of the adjustment image, wherein the at least one adjustment reference point is located in the corresponding at least one pattern array, wherein the step of adjusting the position of the at least one adjustment reference point of the adjustment image by the projection device further comprises:

adjusting the adjustment image such that a correction frame of a projection target is located between the outer frame and the inner frame; or adjusting the adjustment image such that the outer frame overlaps the correction frame of the projection target.

2. The control method of the projection device according to claim 1, wherein the at least one pattern array comprises at least one grid pattern array, and the at least one adjustment reference point is adjusted to any grid pattern of the at least one grid pattern array, or the at least one pattern array comprises at least one dot pattern array, and the at least one adjustment reference point is adjusted to any dot pattern of the at least one dot pattern array.

3. The control method of the projection device according to claim 1 further comprising the following steps:

receiving the first original command, and inputting the first original command into a natural language model by a cloud server;

receiving the second original command, and inputting the second original command into the natural language model by the cloud server;

wherein the step of projecting the adjustment image by the projection device comprises:

generating a first standard command according to the first original command by the natural language model, and receiving the first standard command to control the projection device to project the adjustment image by the cloud server;

wherein the step of adjusting the position of the at least one adjustment reference point of the adjustment image by the projection device comprises:

generating a second standard command according to the second original command by the natural language model, and receiving the second standard command to control the projection device to adjust the position of the at least one adjustment reference point of the adjustment image by the cloud server.

4. The control method of the projection device according to claim 3, wherein the steps of transmitting the first original command by the terminal device and transmitting the second original command by the terminal device comprise:

transmitting the first original command to the projection device by the terminal device, and transmitting the first original command to the cloud server by the projection device; and transmitting the second original command to the projection device by the terminal device, and transmitting the second original command to the cloud server by the projection device.

5. The control method of the projection device according to claim 3, wherein the steps of inputting the first original command and the second original command into the natural language model comprise:

inputting the first original command and a rule command into the natural language model by the cloud server, so that the natural language model outputs the first standard command according to the first original command and the rule command; and inputting the second original command and the rule command into the natural language model by the cloud server, so that the natural language model outputs the second standard command according to the second original command and the rule command.

6. The control method of the projection device according to claim 3, further comprising the following steps:

transmitting the first standard command to the terminal device by the cloud server, so that the terminal device controls the projection device according to the first standard command.

7. The control method of the projection device according to claim 6, wherein the step of controlling the projection device according to the first standard command by the terminal device comprises:

converting the first standard command into a first projector control code according to projection device information to control the projection device by the terminal device.

8. The control method of the projection device according to claim 3, wherein the step of receiving the first standard command by the cloud server further comprises:

converting the first standard command into a first projector control code according to projection device information by the cloud server.

9. The control method of the projection device according to claim 8, wherein the step of controlling the projection device according to the first standard command further comprises:

receiving the first projector control code from the cloud server by the projection device; or receiving the first projector control code from the cloud server and transmitting the first projector control code to the projection device by the terminal device.

10. The control method of the projection device according to claim 1, wherein the step of adjusting the position of the at least one adjustment reference point of the adjustment image by the projection device further comprises:

calculating and adjusting an adjustment angle and a deformation amount of the adjustment image according to the second original command.

11. A projection system, comprising:

a terminal device, configured to transmit a first original command and a second original command; and a projection device, coupled to the terminal device;

wherein the projection device is configured to project an adjustment image in response to the first original command corresponding to an image correction operation of the projection device, wherein the adjustment image comprises an outer frame, an inner frame, at least one pattern array, and at least one adjustment reference point, wherein the at least one pattern array is located between the outer frame and the inner frame, and the at least one adjustment reference point is a vertex of the outer frame; and the projection device is configured to adjust a position of the at least one adjustment reference point of the adjustment image in response to the second original command corresponding to adjusting the position of the at least one adjustment reference point of the adjustment image, wherein the at least one adjustment reference point is located in the corresponding at least one pattern array, wherein the projection device is further configured to:

adjust the adjustment image such that a correction frame of a projection target is located between the outer frame and the inner frame; or adjust the adjustment image such that the outer frame overlaps the correction frame of the projection target.

12. The projection system according to claim 11, wherein the at least one pattern array comprises at least one grid pattern array, and the at least one adjustment reference point is adjusted to any grid pattern of the at least one grid pattern array, or the at least one pattern array comprises at least one dot pattern array, and the at least one adjustment reference point is adjusted to any dot pattern of the at least one dot pattern array.

13. The projection system according to claim 11, further comprising a cloud server configured to receive the first original command and the second original command, and input the first original command and the second original command into a natural language model, wherein the natural language model is configured to generate a first standard command according to the first original command, and configured to generate a second standard command according to the second original command, the cloud server is configured to receive the first standard command to control the projection device to project the adjustment image, and the cloud server is configured to receive the second standard command to control the projection device to adjust the position of the at least one adjustment reference point of the adjustment image.

14. The projection system according to claim 13, wherein the terminal device is configured to transmit the first original command and the second original command to the projection device, and the projection device is configured to transmit the first original command and the second original command to the cloud server.

15. The projection system according to claim 13, wherein the cloud server is configured to input the first original command and a rule command into the natural language model, so that the natural language model outputs the first standard command according to the first original command and the rule command; and the cloud server is configured to input the second original command and the rule command into the natural language model, so that the natural language model outputs the second standard command according to the second original command and the rule command.

16. The projection system according to claim 13, wherein the cloud server is configured to transmit the first standard command to the terminal device, and the terminal device is configured to control the projection device according to the first standard command.

17. The projection system according to claim 16, wherein the terminal device is configured to convert the first standard command into a first projector control code according to projection device information to control the projection device.

18. The projection system according to claim 13, wherein the cloud server is configured to convert the first standard command into a first projector control code according to projection device information.

19. The projection system according to claim 18, wherein the projection device is configured to receive the first projector control code from the cloud server; or the terminal device is configured to receive the first projector control code and a second projector control code from the cloud server, and transmit the first projector control code to the projection device.

20. The projection system according to claim 13, wherein the natural language model is stored in the cloud server or connected to the cloud server through a wireless network.

21. A projection device, comprising:

a projection module, configured to project an adjustment image;

a communication interface, configured to receive a first original command and a second original command; and a processor, coupled to the projection module and the communication interface, wherein the processor is configured to:

control the projection module to project the adjustment image in response to the first original command corresponding to an image correction operation of the projection device, wherein the adjustment image comprises at least one pattern array and at least one adjustment reference point; and control the projection module to adjust a position of the at least one adjustment reference point of the adjustment image in response to the second original command corresponding to adjusting the position of the at least one adjustment reference point of the adjustment image, wherein the at least one adjustment reference point is located in the corresponding at least one pattern array, wherein the adjustment image further comprises an outer frame and an inner frame, the at least one pattern array is located between the outer frame and the inner frame, the at least one adjustment reference point is a vertex of the outer frame, and wherein the processor is further configured to:

control the projection module to adjust the adjustment image such that a correction frame of a projection target is located between the outer frame and the inner frame, or adjust the adjustment image such that the outer frame overlaps the correction frame of the projection target.

22. The projection device according to claim 21, wherein the communication interface is further configured to transmit the first original command and the second original command to a cloud server, and configured to receive a first projector control code and a second projector control code transmitted from the cloud server.

23. The projection device according to claim 21, wherein the processor is configured to: calculate and adjust an adjustment angle and a deformation amount of the adjustment image according to the second original command.

24. A projection device, comprising:

a projection module, configured to project an adjustment image;

a communication interface, configured to receive a first original command and a second original command; and a processor, coupled to the projection module and the communication interface, wherein the processor is configured to:

control the projection module to project the adjustment image in response to the first original command corresponding to an image correction operation of the projection device, wherein the adjustment image comprises at least one pattern array and at least one adjustment reference point; and control the projection module to adjust a position of the at least one adjustment reference point of the adjustment image in response to the second original command corresponding to adjusting the position of the at least one adjustment reference point of the adjustment image, wherein the at least one adjustment reference point is located in the corresponding at least one pattern array, wherein the communication interface is further configured to transmit the first original command and the second original command to a cloud server, and configured to receive a first standard command and a second standard command transmitted from the cloud server, and the processor is configured to convert the first standard command and the second standard command into a first projector control code and a second projector control code according to projection device information to control the projection module and adjust the adjustment image.

* * * * *